Patented Aug. 22, 1950

2,520,061

UNITED STATES PATENT OFFICE 2,520,061

METHOD FOR PRODUCING ALFALFA PRODUCTS

Mark C. Rich, Council Bluffs, Iowa

No Drawing. Application January 25, 1947,
Serial No. 724,469

2 Claims. (Cl. 99—22)

The invention relates to products produced from alfalfa.

One object of the present invention is to provide alfalfa products which contain the vitamins of alfalfa, which is palatable and which is adapted to be kept for consumption as desired.

Another object of the invention is to produce from alfalfa, an alcoholic having qualities similar to those of grain alcohol.

Another object is to produce from alfalfa, a product which is useable in making vinegar.

Other objects of the invention will appear from the detailed description.

The invention consists in the products hereinafter set forth and more particularly defined by claims at the conclusion hereof.

In the manufacture of alfalfa products according to the present invention, alfalfa is harvested or cut when it is about 12 to 18 inches high, and about 20 days old. In this condition, the alfalfa is free from woody or hard fibre, as compared with its condition when it is from 30 to 35 days old and from 24 to 30 inches high. The alfalfa is cut about 5 inches above the ground, to leave about 5 inches of stubble. After being cut, the alfalfa is loosely distributed over the ground in, for example, windrows, and subjected to the rays of or cured in, the sun, for 3 to 5 days. This curing results in a chemical reaction while the alfalfa is on the ground, and develops a high rate of substantially all vitamins: A, $B_1$, $B_2$, $B_6$, $B_c$, C, D, E, F, G and K. This treatment also sweetens the odor of and eliminates its pungency.

Next, the sun-cured alfalfa is cut or ground to pieces about $\frac{1}{8}''$ in length.

Next, an extract is produced by boiling from $7\frac{1}{2}$ to 10 pounds of ground alfalfa and approximately 3 gallons of water, for a period of approximately 30 minutes. This extract is then filtered, to remove the alfalfa particles.

Next, the filtered extract is boiled in an open kettle or pan, down to about 50% of its volume. If the extract is not immediately used, about one-tenth of 1% by volume, of benzoate of soda is added, to prevent fermentation of the extract.

Next, the extract is boiled for approximately an hour, in a vacuum pan or covered boiler, which develops acids which act on the carbohydrates and reduces them to sugar.

Next, the solution is placed in an open wooden vessel or container, and kept at a temperature of 80 to 90 degrees Fahrenheit, for 5 to 8 days, which produces fermentation.

Next, the fermented solution is placed in a vacuum or retort, and heat of about 160 to 180 degrees Fahrenheit is applied thereto. This heat distils or drives off, the alcohol vapor from the solution. The vapor is passed through a condenser, for condensing it to liquid alcohol.

The cut alfalfa, treated as aforesaid, contains from 28 to 36% carbohydrates, which is converted into a form of sugar which, by fermentation, is converted into an alcoholic product of substantially the same constituency of alcohol. This alcohol is useable for the same purposes as pure grain alcohol.

The solution from which the alcohol has been distilled, contains the following:

| | |
|---|---|
| Protein | .4585 |
| Sol. ash | .1430 |
| Insol. ash | .3720 |
| Total sugars | .4200 |
| Nitrogen free ext. | 2.2065 |
| Volatile acids | 7.5000 |
| Fixed acids | 3.7500 |
| Water | 81.5500 |

This solution may then be used for the production of vinegar, by further fermentation. For this purpose, the solution is then retained in a suitable vessel, for further fermentation, for about 2 to 3 days, at a temperature of about 90 degrees Fahrenheit. This fermentation results in converting the protein and volatile acids into acetic acid.

The fermented solution is then distilled and the acetic vapor is separated and distilled from the solution and passed through a condenser in which it is liquefied. This condensation product is useable for making vinegar or any product in which acetic acid is a constituent.

When it is desired to use the extract before the sugar has been converted into alcohol, for use as a flavoring extract, the extract is made from $7\frac{1}{2}$ pounds of dry cut alfalfa and 3 gallons of water, which is boiled for about 30 minutes. When the extract is used for producing alcohol and acetic acid, it is preferable to make a stronger extract from about 10 pounds of ground alfalfa and 3 gallons of water.

The invention is not to be understood as limited to the details described, since these may be modified within the scope of the appended claims without departing from the spirit or scope of the invention.

Having thus described the invention, what I claim as new and desire to secure by Letters Patent is:

1. That improvement which comprises suncuring cut alfalfa free from woody or hard fiber for a period ranging from three to five days and developing a high rate of vitamins A, $B_1$, $B_2$, $B_6$, $B_c$, C, D, E, F, G and K, grinding the cured alfalfa, boiling the ground alfalfa in the proportions of 7½ to 10 pounds in approximately three gallons of water to produce an extract, filtering the alfalfa particles from the extract, boiling the extract from which the alfalfa particles have been filtered to reduce its volume about 50%, boiling the reduced extract for approximately one hour in a vacuum pan to develop acids which act on carbohydrates and reduce them to sugar, fermenting the reduced extract at a temperature of 80° to 90° Fahrenheit for five to eight days, distilling the alcohol vapor from the fermented extract and condensing the distillate into liquid alcohol.

2. That improvement which comprises suncuring cut alfalfa free from woody or hard fiber for a period ranging from three to five days and developing a high rate of vitamins A, $B_1$, $B_2$, $B_6$, $B_c$, C, D, E, F, G and K, grinding the cured alfalfa, boiling the ground alfalfa in the proportions of 7½ to 10 pounds in approximately three gallons of water to produce an extract, filtering the alfalfa particles from the extract, boiling the extract from which the alfalfa particles have been filtered to reduce its volume about 50%, boiling the reduced extract for approximately one hour in a vacuum pan to develop acids which act on carbohydrates and reduce them to sugar, fermenting the reduced extract at a temperature of 80° to 90° Fahr. for five to eight days, distilling the alcohol vapor from the fermented extract, condensing the distillate into alcohol, and fermenting the residue after distillation for two to three days at a temperature of about 90° Fahr. and converting the protein and volatile acids into acetic acid.

MARK C. RICH.

REFERENCES CITED

The following references are of record in the file of this patent:

UNITED STATES PATENTS

| Number | Name | Date |
|---|---|---|
| 46,943 | Rino | Mar. 21, 1865 |
| 57,238 | Wills | Aug. 14, 1866 |
| 1,195,152 | Rich | Aug. 15, 1916 |
| 1,756,574 | Takamine | Apr. 29, 1930 |

OTHER REFERENCES

Prescott and Dunn: Industrial Microbiology, McGraw-Hill Book Co., N. Y., 1940, pp. 41, 236.